United States Patent
Kadavy et al.

(10) Patent No.: US 11,090,596 B2
(45) Date of Patent: Aug. 17, 2021

(54) VARIABLE DIAMETER TOP FOR A FILTER ELEMENT

(71) Applicants: Dale R. Kadavy, Overland Park, KS (US); Jeffery Michael Ladwig, Overland Park, KS (US)

(72) Inventors: Dale R. Kadavy, Overland Park, KS (US); Jeffery Michael Ladwig, Overland Park, KS (US)

(73) Assignee: BHA Altair. LLC, Franklin, TN (US)

( * ) Notice: Subject to any disclaimer, the term of this patent is extended or adjusted under 35 U.S.C. 154(b) by 198 days.

(21) Appl. No.: 16/315,501

(22) PCT Filed: Jul. 3, 2017

(86) PCT No.: PCT/US2017/040593
§ 371 (c)(1),
(2) Date: Jan. 4, 2019

(87) PCT Pub. No.: WO2018/009480
PCT Pub. Date: Jan. 11, 2018

(65) Prior Publication Data
US 2019/0232205 A1    Aug. 1, 2019

Related U.S. Application Data

(60) Provisional application No. 62/359,451, filed on Jul. 7, 2016.

(51) Int. Cl.
*B01D 46/00*    (2006.01)
*B01D 46/02*    (2006.01)
*B01D 46/42*    (2006.01)

(52) U.S. Cl.
CPC ......... *B01D 46/0005* (2013.01); *B01D 46/02* (2013.01); *B01D 46/42* (2013.01); *B01D 2265/05* (2013.01); *B01D 2271/02* (2013.01)

(58) Field of Classification Search
CPC .. B01D 46/002; B01D 46/0005; B01D 46/02; B01D 46/521; B01D 46/2411; B01D 46/2407
USPC ............................... 55/378, 379, 360, 341.1
See application file for complete search history.

(56) References Cited

U.S. PATENT DOCUMENTS

| | | | |
|---|---|---|---|
| 5,746,792 A | 5/1998 | Clements et al. | |
| 7,186,284 B2 * | 3/2007 | Clements | ........... B01D 46/0005 55/341.1 |
| 7,294,163 B1 * | 11/2007 | LaCroix | ............ B01D 46/0005 55/378 |
| 7,632,325 B2 * | 12/2009 | Welch | .................. B01D 46/002 55/341.1 |

(Continued)

FOREIGN PATENT DOCUMENTS

| | | |
|---|---|---|
| CN | 2671664 Y | 1/2005 |
| CN | 104329525 A | 2/2015 |

(Continued)

*Primary Examiner* — Minh Chau T Pham
(74) *Attorney, Agent, or Firm* — Reinhart Boerner Van Deuren P.C.

(57) ABSTRACT

A filter element configured to be mounted to tube sheet openings of different diameters is provided. The filter element includes a seal member that can accommodate tube sheet openings of different diameters. Methods of mounting a plurality of identical filter elements to tube sheets having different tube sheet opening diameters is provided.

13 Claims, 6 Drawing Sheets

(56) References Cited

U.S. PATENT DOCUMENTS

| | | | | |
|---|---|---|---|---|
| 8,580,004 B1 * | 11/2013 | Clements | ............. | B01D 46/521 |
| | | | | 55/360 |
| 8,580,006 B2 * | 11/2013 | LaCroix | ............. | B01D 46/2411 |
| | | | | 55/378 |
| 8,961,637 B2 * | 2/2015 | Raether | .............. | B01D 46/0005 |
| | | | | 55/378 |
| 10,661,212 B2 * | 5/2020 | Grothues | ........... | B01D 46/2407 |
| 2004/0237483 A1 | 12/2004 | Clements | | |
| 2007/0266681 A1 * | 11/2007 | Grey | ..................... | B01D 46/02 |
| | | | | 55/378 |
| 2008/0120949 A1 | 5/2008 | Welch et al. | | |
| 2012/0324844 A1 * | 12/2012 | Zhang | ................ | B01D 46/0005 |
| | | | | 55/378 |
| 2012/0324845 A1 * | 12/2012 | Doehla | .................. | B01D 46/02 |
| | | | | 55/378 |

FOREIGN PATENT DOCUMENTS

| | | | |
|---|---|---|---|
| JP | 3471710 B2 | 12/2003 | |
| JP | 2005205347 A | 8/2005 | |

\* cited by examiner

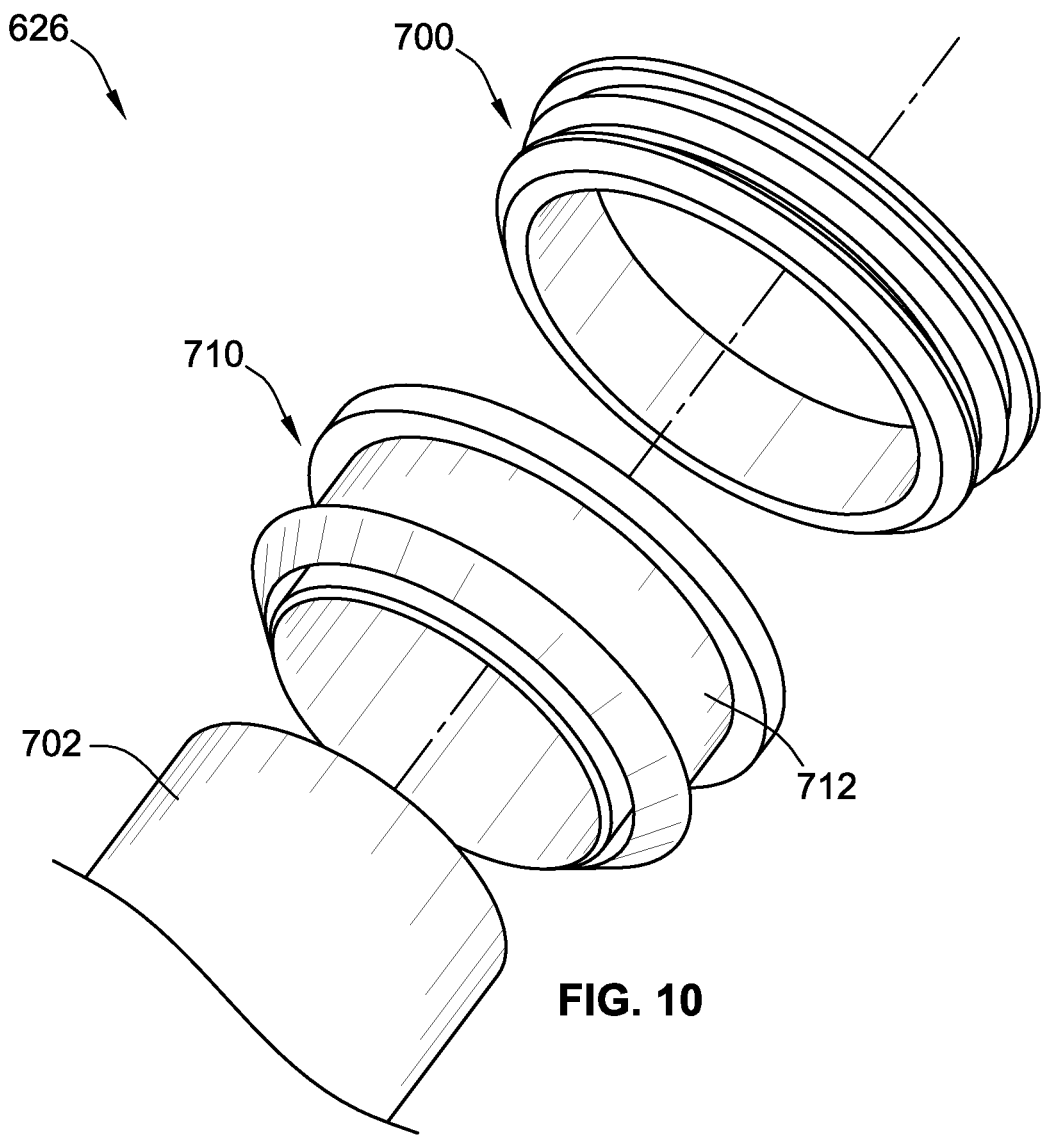
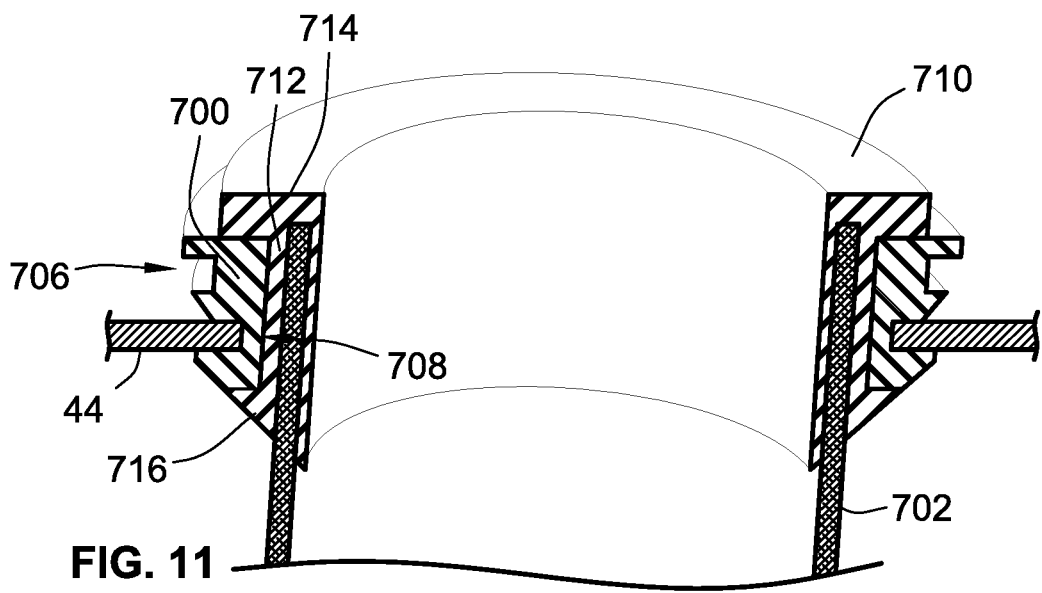

VARIABLE DIAMETER TOP FOR A FILTER ELEMENT

FIELD OF THE INVENTION

This invention generally relates to filtering of air and particularly systems for filtering air and filter elements for use in systems for filtering air.

BACKGROUND OF THE INVENTION

There is a desire to capture air born particulates to reduce air-borne pollutants and emissions from certain industrial sources as well as to reduce the number of air-borne particulates present in air being used in downstream systems, such as power plants and materials production facilities throughout the world. A known technique to control and capture the particulates or emissions is to separate the particulate matter that is carried in a gas stream by using filtration media. Historically, the filtration media was a fabric and the fabric filtration was accomplished in a filter system in the form of a dust collection apparatus known in the industry as a "baghouse."

The baghouse typically includes a housing divided into two plenums by a tube sheet. One plenum is a "dirty air" plenum which communicates with an inlet and receives "dirty" or particulate laden gas from a source at the plant. The other plenum is a "clean air" plenum which receives cleaned gas after filtration and communicates with an outlet to direct cleaned gas away from the baghouse. A plurality of relatively long cylindrical fabric filter elements, commonly called "bags," "pleated filters," "pleated bags," or "cartridges" are suspended from the tube sheet in the dirty air plenum. Each filter element has a closed lower end and is typically installed over a cage. Each filter element is mounted to the tube sheet at its upper end and hung vertically downward into the dirty air plenum. The upper end portion of the filter element was open and the interior of each filter element is in fluid communication with the clean air plenum. However, air flow in the opposite direction is also possible.

One problem with baghouses is that the opening through the tube sheet that connects the clean air plenum and dirty air plenum can often vary from one baghouse to the next. Due to this, it can be difficult to maintain a large number of baghouses because there may be a need for a large number of different mounting interfaces for the various different openings. This can require a large number of different filter elements to be maintained on hand which provides logistical difficulties. Further, due to the large number of filter elements, manufacturing efficiencies and quantities of each individual filter are reduced further increasing cost of the manufacture of the filters.

Embodiments of the invention provide improvements over the art as it relates to replaceable filter elements or cartridges for baghouse filtration systems.

BRIEF SUMMARY OF THE INVENTION

In one aspect, the invention provides a filter element that has a seal member configured to be able to be mounted to an opening of a tube sheet having a first diameter or to be able to be mounted to an opening of a tube sheet having a second diameter. This allows for a plurality of filter elements all having the same configuration to be manufactured for use in different applications.

Methods of providing a plurality of identical filter elements and mounting one or more of the filter elements in a tube sheet opening having a first diameter and mounting another one or more of the filter elements in a tube sheet opening having a second diameter different than the first diameter is also provided.

Other aspects, objectives and advantages of the invention will become more apparent from the following detailed description when taken in conjunction with the accompanying drawings.

BRIEF DESCRIPTION OF THE DRAWINGS

The accompanying drawings incorporated in and forming a part of the specification illustrate several aspects of the present invention and, together with the description, serve to explain the principles of the invention. In the drawings:

FIG. 10 is an exploded illustration of an embodiment of a filter element; and FIG. 11 is a cross-sectional illustration of the filter element of FIG. 10.

Figure 1:
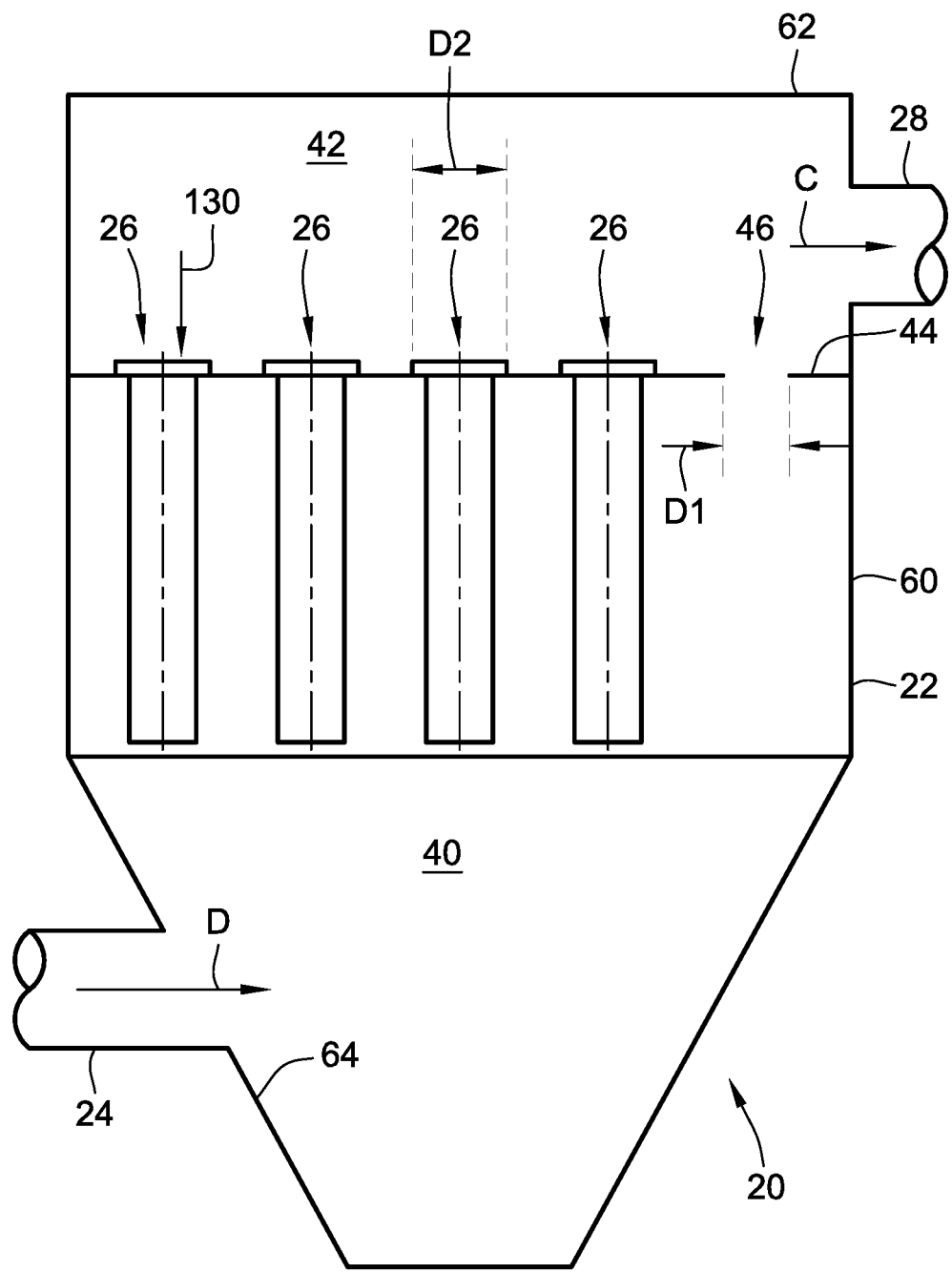
FIG. 1 is a schematic illustration of a baghouse for use with filter elements according to embodiments of the invention.

While the invention will be described in connection with certain preferred embodiments, there is no intent to limit it to those embodiments. On the contrary, the intent is to cover all alternatives, modifications and equivalents as included within the spirit and scope of the invention as defined by the appended claims.

DETAILED DESCRIPTION OF THE INVENTION

Certain terminology is used herein for convenience only and is not to be taken as a limitation on the present invention. Relative language used herein is best understood with reference to the drawings, in which like numerals are used to identify like or similar items. Further, in the drawings, certain features may be shown in somewhat schematic form.

A filter system in the form of a baghouse 20 is illustrated in FIG. 1. The baghouse 20 is defined by an enclosed housing 22. The housing 22 is made from a suitable material, such as sheet metal. Particulate laden gas D flows into the baghouse 20 from an inlet 24. The particulate laden gas D is filtered by a plurality of relatively long filter elements or filter assemblies 26 constructed according to one aspect of the invention located within the baghouse 20. Cleaned gas C exits through an outlet 28 of the baghouse 20.

The baghouse 20 is divided into a "dirty air" plenum 40 and a "clean air" plenum 42 by a tube sheet 44 made from a suitable material, such as sheet metal. The tube sheet 44 has at least a portion that is substantially planar. The inlet 24 is in fluid communication with the dirty air plenum 40. The outlet 28 is in fluid communication with the clean air plenum 42.

A plurality of openings 46 extend through the planar portion of the tube sheet 44. A filter element 26 is installed in a respective opening 46, and can optionally extend at least partially through the respective opening 46. The filter element 26 can be suspended by the tube sheet 44 itself, or any other suitable support adjacent to the openings 46 in which the filter element 26 is to be installed. The clean air plenum 42 has a minimum dimension or clearance height taken in a direction normal to the tube sheet 44 that defines an access space. The dirty air plenum 40 has a height taken in a direction normal to the tube sheet 44 in which a filter element 26 can be installed without engaging the housing 22 of the baghouse 20. The height of the dirty air plenum 40 is typically greater than the height of the clean air plenum 42.

The housing 22 of the baghouse 20 includes sides 60 and a roof 62. The baghouse 20 is illustrated as having a non-movable roof 62. Thus, access to the clean air plenum 42 and baghouse 20 is limited for installation of the filter assemblies 26. It will be apparent to one skilled in the art that the roof 62 can have access panels that are removable or movable to a position that does not inhibit access to the clean air plenum 42.

The baghouse 20 also has an accumulation chamber defined by sloped walls 64 located at a lower end of the dirty air plenum 40. The filter assemblies 26 are illustrated as not extending into the accumulation chamber but it will be apparent that the filter assemblies may extend into the accumulation chamber.

Unfortunately, as noted above, the diameter D1 of opening 46 of one baghouse can be different from the diameter of another baghouse.

Figure 2:
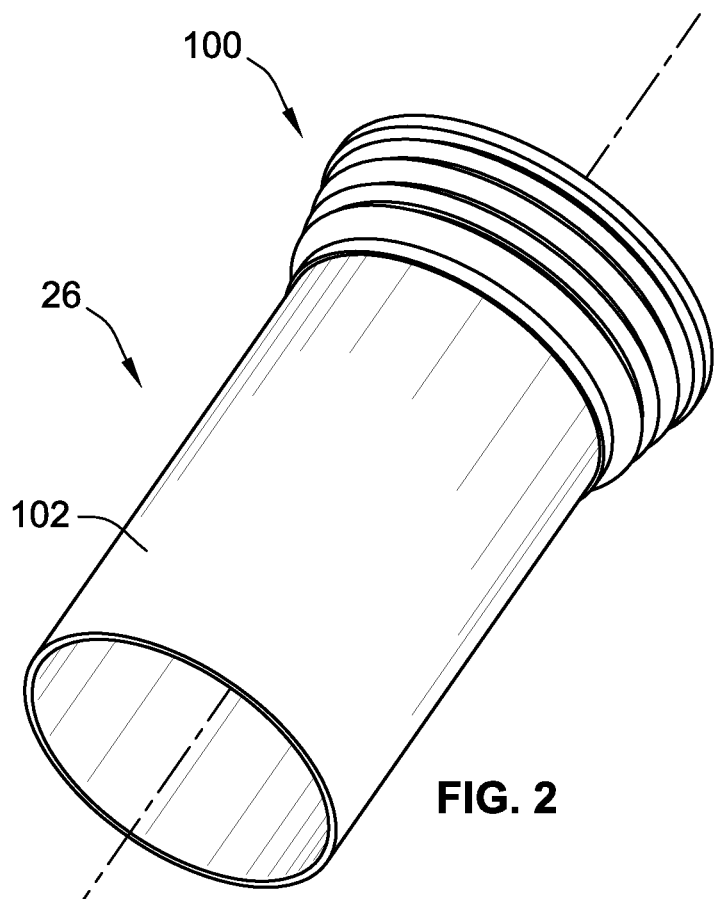
FIG. 2 is an isometric illustration of a filter elements for use in the baghouse of FIG. 1.
Figure 3:
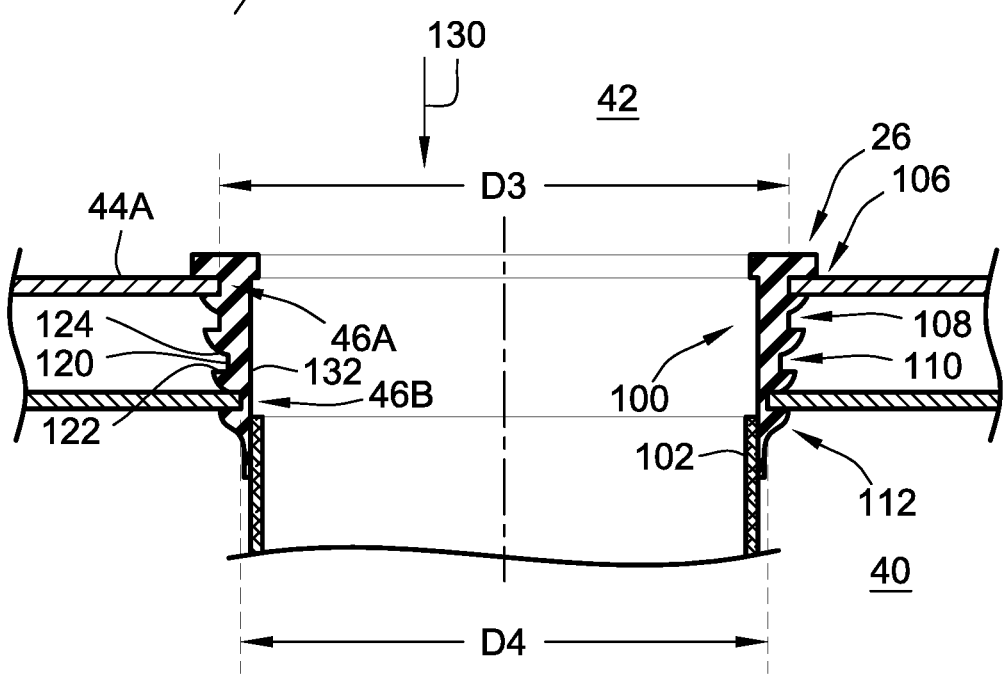
FIG. 3 is a cross-sectional illustration of the filter elements of FIG. 2 illustrated mounted to tube sheets having openings having different diameters.
Figure 4:
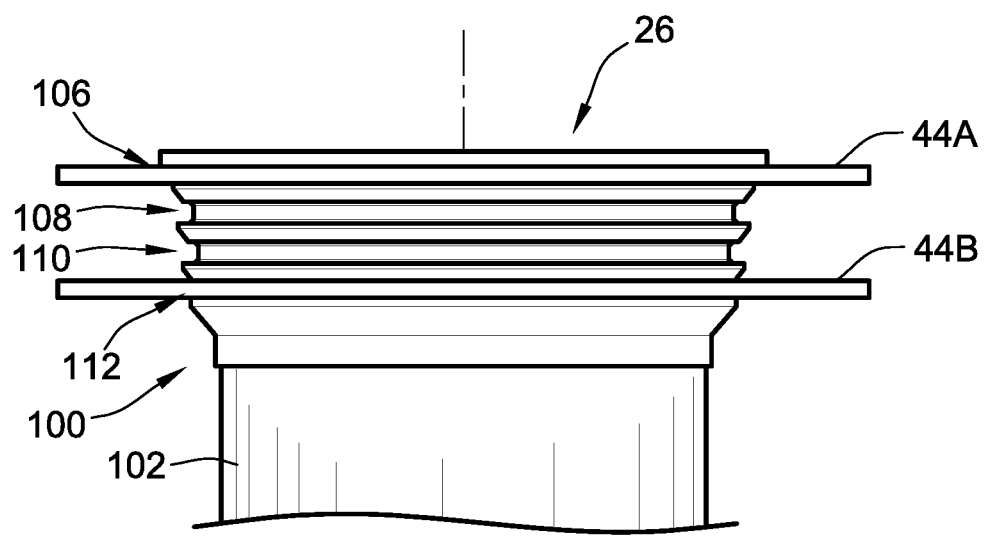
FIG. 4 is a side view of FIG. 3.

FIGS. 2-4 illustrates an embodiment of a filter element 26 in more detail. The filter element 26 includes a seal member 100 operably attached to a filter media 102. The filter media 102 may be a fabric bag, pleated material, or other type of filter media known in the art. The seal member 100 is operably attached to the filter media 102 to prevent fluid bypass.

With principle reference to FIG. 3, the seal member 100 is designed such that the filter element 26 can be mounted to tube sheets having openings of different diameters. In FIG. 3, the openings 46A of tube sheet 44A have a diameter D3 that is larger than the diameter D4 of openings 46B of tube sheet 44B. However, the seal member 100 is configured such that the seal member 100 can sealingly cooperate with either opening 46A having diameter D3 or opening 46B having diameter D4. While illustrated in FIGS. 3 and 4 as being mounted to two separate tube sheets 44A, 44B, this is simply for illustrative purposes to illustrate the ability to mount to different tube sheets having different opening diameters. The filter element 26 would typically be mounted to a single tube sheet.

The seal member 100 includes a sealing arrangement that is configured to cooperate with the openings 46A, 46B of different diameters. The sealing arrangement of this embodiment is formed by a plurality of grooves 106, 108, 110, 112 that each have a different diameter defined by a radially outward facing surface which forms the bottom of grooves 106, 108, 110, 112. Each groove 106, 108, 110, 112 is configured to mate the filter element 26 with openings 46 of different diameters.

With reference to groove 110, each groove has a bottom region 120 that is axially bounded by axially facing wall portions 122, 124 formed by radially extending projections. The axially facing wall portions 122, 124 are used to axially locate the filter element 26 within opening 46 of the tube sheet. Wall portions 122, 124 preferably engage the tube sheet on both the clean and dirty side to hold the filter element 26 in place. The bottom portion 120 and/or one or more of the wall portions 122, 124 can provide a seal between the seal member 100 and tube sheet 44 to prevent fluid bypass. Preferably, the inner diameter of opening 46 presses radially inward and compresses the seal member 100 to form a radial seal between the seal member 100 and the tube sheet 44.

The filter element 26 will typically be installed by inserting the 26 through the opening 46 from the clean side 42 illustrated by arrows 130 in FIGS. 1 and 3. As such, one axial side of the projection includes a tapered region that facilitates insertion of the filter element 26 into opening 46.

The seal member 100 may be molded to the filter media 102, adhered to the filter media or otherwise secured to the media. The seal member could be formed from a flexible, elastomeric material, a non-woven textile material, or a combination of rigid and flexible materials. In one embodiment, the seal member 100 could be formed from a urethane such as a foamed urethane. Further, a reinforcing member may be provided to provide support of the seal member 100 to improve its sealing engagement with the tube sheet 46. For instance, a ring shaped reinforcing member could press radially inward on an inner surface 132 of the seal member 100 (e.g. a snap ring or an expander). Further, a reinforcing ring could be embedded within the seal member 100.

Further yet, a seal member could have one or more seals attached to a rigid structure such as a plastic support structure to which one or more flexible seal is mounted.

Figure 5:
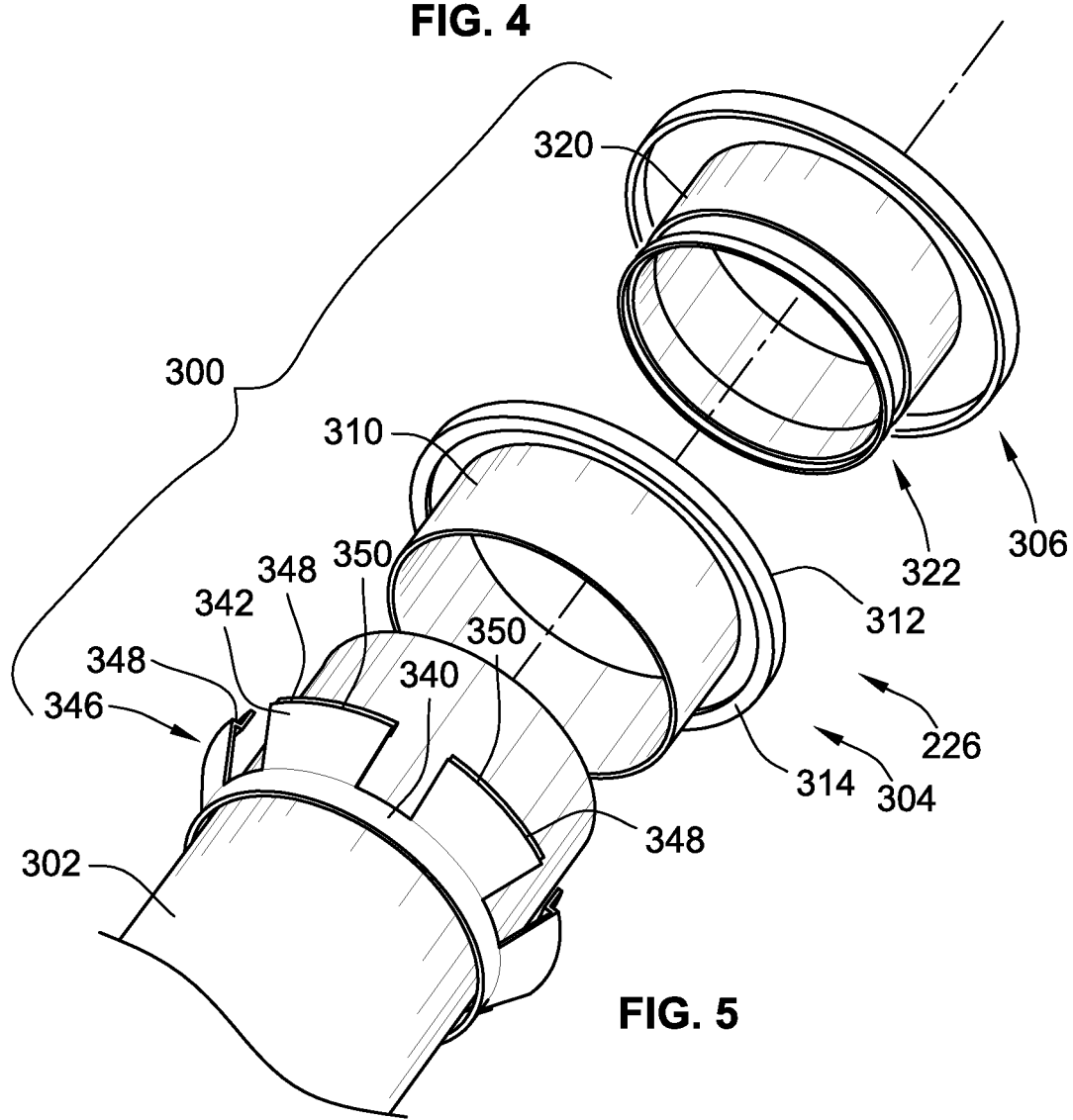
FIG. 5 is an exploded illustration of an embodiment of a filter element.
Figure 6:
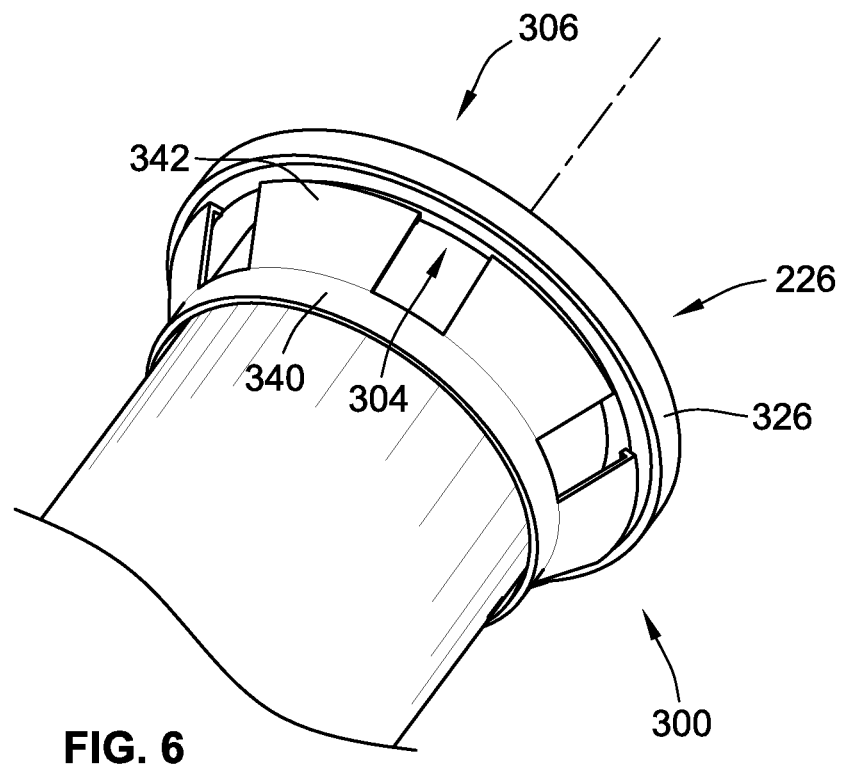
FIG. 6 is an isometric illustration of the filter element of FIG. 5.
Figure 7:
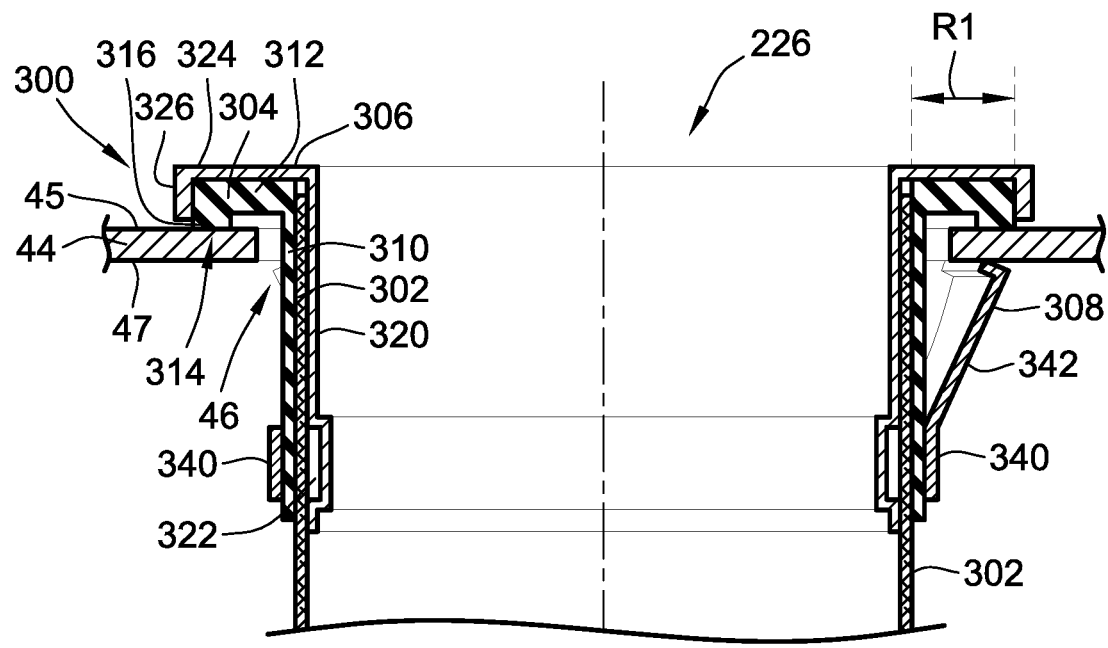
FIG. 7 is a cross-sectional illustration of the filter element of FIG. 5 mounted to a tube sheet.

FIGS. 5-7 illustrate a further embodiment of a filter element 226 configured to mate with openings of tube sheets having different diameters.

In this embodiment, the seal member 300 is a multi-component seal member 300 operably sealingly secured to filter media 302.

In this embodiment, the seal member 300 includes a gasket 304 that is supported by a flange member 306. Seal member 300 also includes an axial mounting clip member 308. The gasket 304 is configured to provide, at least, an axial seal on a clean side surface 45 of the tube sheet 44. The clip member 308 presses axially on a dirty side surface 47 of the tube sheet 44.

The gasket 304 includes a main body 310 and a radially extending flange portion 312 that defines an axially facing seal surface 314 that cooperates with surface 45 of tube sheet 44 to effectuate a seal therebetween. Seal surface 314 is formed on an axially extending projection 316 that extends from flange portion 312. In this embodiment, the main body 310 is generally tubular and extends through the opening 46 when the filter element 226 is mounted to the tube sheet 44.

The radial dimension R1 of the flange portion 312 allows the flange portion 312 to cooperate with openings 46 in tube sheets 44 having different inner diameters. Ideally, R1 is at least ¼ of an inch, more preferably ½ of an inch and in some instances can be greater than ¾ of an inch. Gasket 304 may be formed from a compressible, elastomeric material or a non-woven textile material. The outside diameter of the flange portion 312 is such that it can cover multiple openings 46 having different inner diameters.

The flange member 306 provides axial support for flange portion 312. The flange member 306 can also assist in securing the filter media 302 to the gasket 304. The flange member includes a main body 320 that is generally tubular and internal of the main body 310 of the gasket 304. The main bodies 310, 320 form an annular cavity therebetween in which the filter media 302 may extend to provide a sealing engagement between the seal member 300 and the filter media 302.

The main body 320 may include a groove 322 in which a portion of the filter media 310 and/or a portion of the gasket 304 (main body 310) can be compressed radially to form a mechanical connection between the gasket 304 and flange member 306 to axially secure the two components together.

A radially extending support flange portion 324 extends radially outward from main body 320 and provides axially support to the flange portion 312. In the illustrated embodiment, an axially extending annular flange 326 extends from the flange portion 324. Annular flange 326 is positioned radially outward from flange portion 312. Preferably, flange member 306 is formed from a rigid material to support the gasket 304 and provide durability.

The clip member 308 includes a main ring 340 and a plurality of axially extending clips 342. In clip member 308 is used to axially secure the filter element 226 on a dirty side 47 of the tube sheet 44.

The clips 342 include radially outward tapered sections that are used to guide the filter element 226 when being inserted into opening 46. A distal end of the clips 342 is stepped radially inward. This stepped region 346 includes a radially inward extending abutment 348 and an axially extending tip 350. While not illustrated, the abutment 348 can, preferably, abut against dirty side 47 of the tube sheet while the tip 350 extends axially into opening 46 of the tube sheet 44. The tips 350 will press radially outward on the inner diameter of opening 46 and radially locate the filter element 226 within opening 46 while abutment 348 axially locates the filter element.

The clip member 308 may be affixed to the rest of the filter element mechanically, adhesively or otherwise to prevent axial movement of the clip member 308.

In some embodiments, the clip member may move radially or axially to secure the filter element 226 to the tube sheet 44. Further, the clips 342 may be actuated into place by inserting the filter element 226 into the opening or by rotating the filter.

The clips 342 are radially resilient such that the clips 342 can be located in openings 46 having different diameters.

While the gasket 304 includes main body 310, some embodiments may use only a gasket (e.g. structure 312) pressed axially between flange member 308 and the tube sheet 44.

Flange member 308 could be a reusable component.

Figure 8:
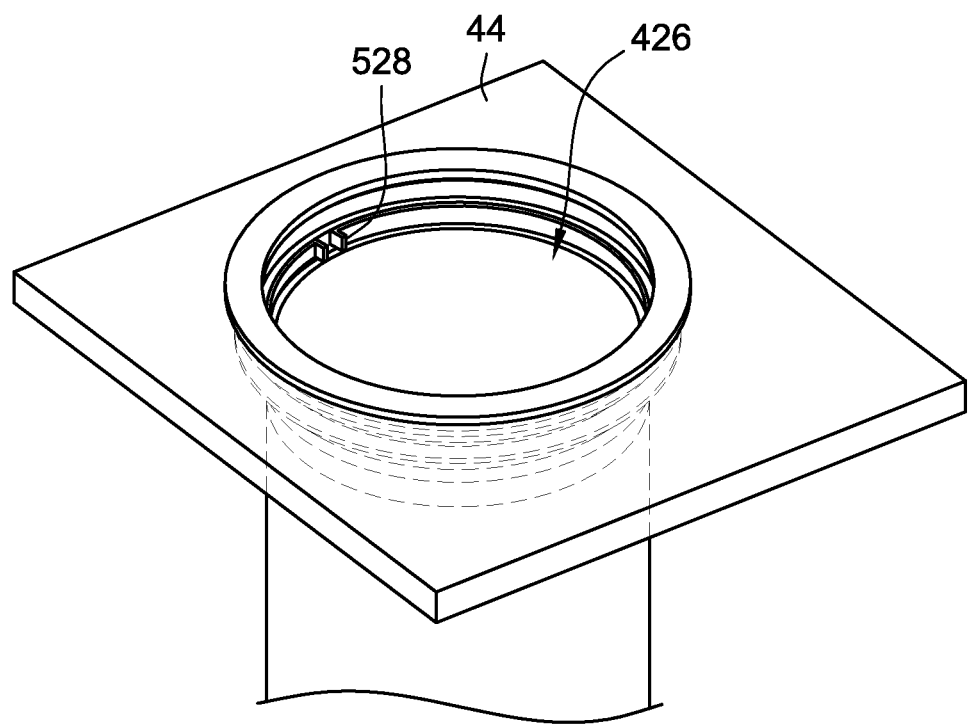
FIG. 8 is an isometric illustration of an embodiment of a filter element mounted to a tube sheet.
Figure 9:
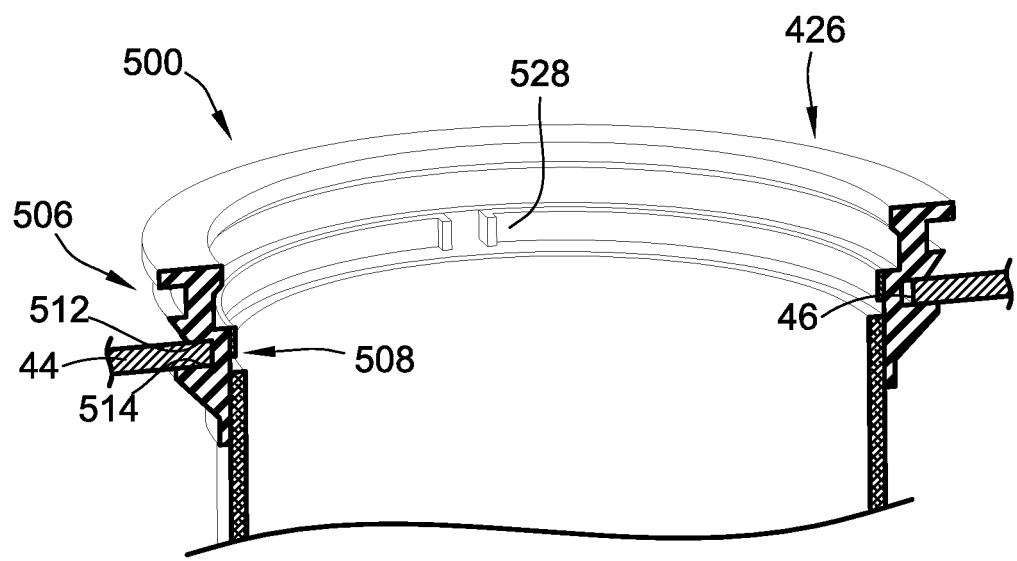
FIG. 9 is a cross-sectional illustration of FIG. 8.

FIGS. 8-9 illustrate a further embodiment of a filter element 426 configured to sealingly mate with openings having different dimensions.

Seal member 500 is similar to seal member 100 discussed previously. Seal member 500 includes grooves 506, 508 having different outer radial dimensions to cooperate with different opening diameters. The grooves 506, 508 are formed between radially extending projections that axially capture the tube sheet 44 between sidewall portions 512, 514. Again, the projections may have tapers to assist in inserting/mounting of the filter element 426.

In this embodiment, the seal member 100 is expandable and formed from a flexible, elastomeric material or a combination of rigid and elastomeric materials. An expander 528 is used to expand the outer diameter of the various grooves to accommodate different opening diameters. By providing different grooves 506, 508, a larger variance in openings can be accommodated where each groove can be manipulated within a given amount of deformation. Once too much deformation would be required, the next larger groove size can be used.

In one embodiment, the expander 528 could be configured to provide sufficient biasing of both the large groove 506 and the smaller groove 508. In other embodiments, multiple expanders could be provided, e.g. one for each of the different sized grooves.

The expander 528 presses radially outward on radially inner surface of the seal member 500 to bias the outer periphery of the seal member 500 radially into the inner diameter of opening 46. The expander could be in the form of a snap ring. In some embodiments, the expander could be embedded within the seal member. The expander could be mechanically adjustable such as with screws. The expander could include radially offset steps with one step located proximate each of the grooves. Further, a conical expander could be provided and the inner surface of the seal member 500 could be similarly conically shaped.

Again, ideally, a radial seal is provided between the seal member 500. However, other portions of the seal member 500 can seal with the tube sheet.

FIGS. 10 and 11 illustrate a further embodiment of a filter element 626 that includes a seal member 700 configured to mate with openings of tube sheets having different diameters.

The filter element 626 includes a seal member 700 that operates similar to seal members 100 and 500 discussed previously. The seal member 700 sealingly couples the filter media 702 to tube sheet 44 and includes grooves 706, 708 that cooperate with openings of different diameters.

In this embodiment, a top member 710 is formed that supports seal member 700. The top member 710 is formed from a polymeric resin and woven or non-woven textile. The woven or non-woven textile in the top member 710 may be integral to the filter media 702.

The top member 710 has an end of the filter media 702 embedded in the polymeric resin. The top member 710 includes a main body 712 and a pair of radially extending flanges 714, 716 forming a groove therebetween. In this embodiment, the seal member 700 is located within the groove. Flange 716 may be tapered to facilitate mounting of the filter element 626 as well as mounting seal member 700 to the top member 710. In some embodiments, the seal member 700 could be molded directly to the top member 710. Additionally, the seal member 700 could be separately formed and then attached to top member 710. An adhesive may be provided between seal member 700 and top member 710.

The polymeric resin may be flexible, elastomeric material or may be rigid.

While this embodiment includes a seal member 700 that includes grooves similar to seal members 100 and 500, other embodiments could include a seal member similar to seal member 300 that includes the radially extending flange 312 that provides for axially sealing to the tube sheet.

By providing filter elements having a single configuration that can mount and otherwise seal with openings having different sizes, only a single filter element need be produced to provide the replacement for numerous different sized openings. This single filter element configuration can be used to replace multiple different sized configurations. As such, methods of providing multiple identical filter elements and mounting one of the filter elements in a first opening having a first diameter and mounting another one of the filter elements in a second opening having a second diameter different than the first diameter are provided.

All references, including publications, patent applications, and patents cited herein are hereby incorporated by reference to the same extent as if each reference were individually and specifically indicated to be incorporated by reference and were set forth in its entirety herein.

The use of the terms "a" and "an" and "the" and similar referents in the context of describing the invention (especially in the context of the following claims) is to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

What is claimed is:

1. A filter element for use with tube sheet openings having different diameters comprising:
    filter media;
    a flexible seal member formed from a flexible, elastomeric material operably attached to the filter media, the seal member having a first groove having a first diameter to seal in a first opening of a tube sheet having a first opening diameter and having a second groove having a second diameter different than the first diameter to seal in a second opening of a tube sheet having a second opening diameter different than the first opening diameter, the second groove being axially offset from the first groove, the first and second grooves being formed in the flexible, elastic material.

2. The filter element of claim 1, wherein the seal member seals to only a single opening at a time.

3. The filter element of claim 1, wherein the seal member is stepped and provides a first region proximate the first groove with a first outer diameter for sealing with the first opening and a second region proximate the second groove with a second outer diameter for sealing with the second opening.

4. The filter element of claim 1, further comprising an expander configured to provide radially outward directed pressure to expand the seal member.

5. The filter element of claim 1, wherein the first groove is in a first region of the seal member and the second groove is in a second region of the seal member;
    further comprising:
    a first expander configured to be able to provide radially outward directed pressure for the first region and to be able to provide radially outward directed pressure for the second region.

6. The filter element of claim 5, wherein the first expander provides radially outward directed pressure to both the first and second regions simultaneously.

7. The filter element of claim 6, wherein the first expander is a stepped expander having a first region of a first diameter and a second region of a second diameter.

8. A method of mounting a plurality of filter elements according to claim 1, comprising:
    mounting a first filter element within a first tube sheet opening having a first diameter and forming a seal with a seal member of the first filter element, the first tube sheet being received in the first groove of the first filter element;
    mounting a second filter element within a second tube sheet opening having a second diameter and forming a seal with a seal member of the second filter element, the second tube sheet being received in the second groove of the second filter element; and
    the first and second filter elements being identical.

9. The filter element of claim 1, wherein the flexible seal member is molded directly to the filter media.

10. The filter element of claim 1, wherein the flexible seal member is adhered directly to the filter media.

11. The filter element of claim 1, further comprising a rigid top member attached to the filter media, the rigid top member supports the flexible seal member and attaches the flexible seal member to the filter media.

12. A filter element for use with tube sheet openings having different diameters comprising:
    filter media;
    a multi-component seal member operably attached to the filter media, the seal member being configured to seal to a first opening of a tube sheet having a first diameter and to seal to a second opening of a tube sheet having a second diameter different than the first diameter;
    the multi-component seal member including:
        a gasket radially offset outward from the filter media, the gasket providing an axial sealing surface;
        a clip member having a plurality of clips angularly spaced apart, each clip including:
            a radially outward extending tapered section extending axially towards the gasket and terminating in a stepped distal end, the stepped distal end including a radially inward extending abutment extending inward from the tapered section and an axially extending tip extending axially from a radially inner portion of the radially inward extending abutment, the radially inward extending abutment being axially spaced from the axial sealing surface of the gasket forming a gap therebetween such that, when installed, the tube sheet is positioned between the axial sealing surface of the gasket and the radially inward extending abutment with the gasket pressing against a first side of the tube sheet and the radially inward extending abutment pressing against an opposite second side of the tube sheet, the plurality of clips being radially resilient such that the axially extending tip is insertable into the first and second tube sheet openings.

13. The filter element of claim 12, wherein an outer diameter of the gasket is greater than the first and second diameters.

* * * * *